March 28, 1944. P. ERIKSEN 2,345,532
ELECTRIC WELDING HANDLE
Filed April 13, 1942 2 Sheets-Sheet 1
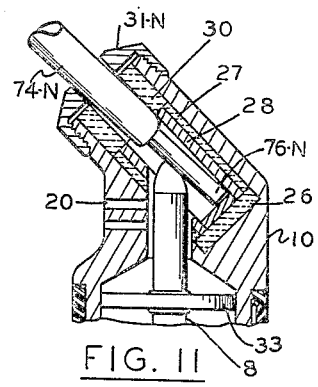
Fig. 11
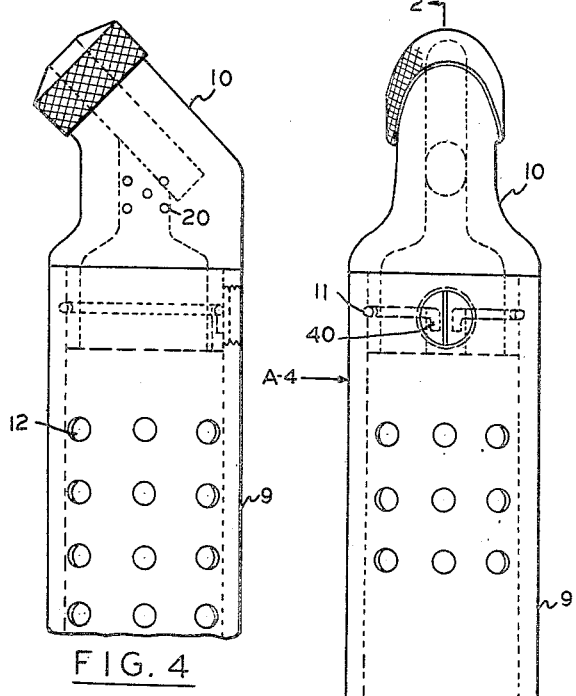
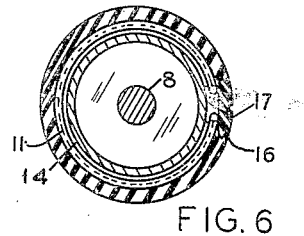
Fig. 6
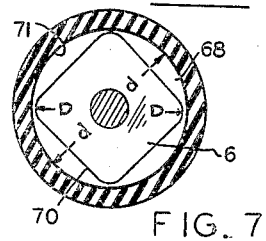
Fig. 7
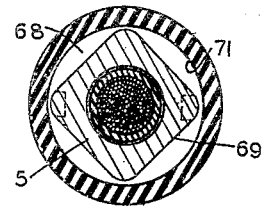
Fig. 8
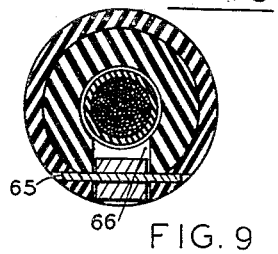
Fig. 9
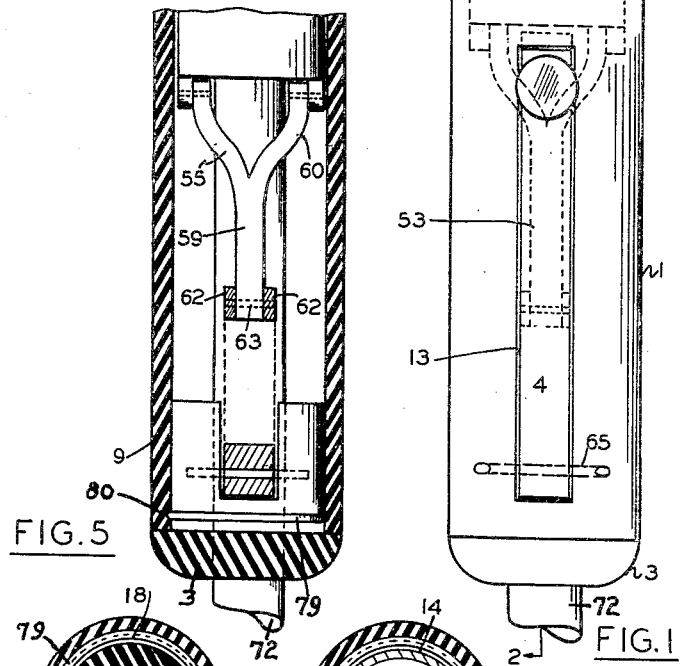
INVENTOR.
PAUL ERIKSEN
BY Caesar and Rivise
ATTORNEYS March 28, 1944.  P. ERIKSEN  2,345,532
ELECTRIC WELDING HANDLE
Filed April 13, 1942  2 Sheets-Sheet 2

INVENTOR.
PAUL ERIKSEN
BY
Caesar and Rivise
ATTORNEYS.

Patented Mar. 28, 1944

2,345,532

UNITED STATES PATENT OFFICE 2,345,532

ELECTRIC WELDING HANDLE

Paul Eriksen, Lansdowne, Pa., assignor of seventy-five per cent to Samuel Albert, Philadelphia, Pa.

Application April 13, 1942, Serial No. 438,767

15 Claims. (Cl. 219—8)

This invention relates to electrode holders commonly known as electric welding handles and has as its object the production of a new and improved device of this type.

More particularly stated it is one of the objects of this invention to produce an electrode holder which will be comparatively simple in design and which will be easy to manufacture.

It is another of the objects of this invention to produce an electrode holder wherein the pressure upon the hand of the welder due to cable twist is reduced to a minimum.

It is still another object of this invention to produce an electrode holder which will not arc or spark when it comes into contact with a metallic surface when said holder is not holding an electrode.

It is a further object of this invention to produce an electrode holder wherein arcing or sparking upon contact of the holder with a metallic surface when said holder is holding an electrode is reduced to a minimum.

It is a still further object of this invention to produce an electrode holder and cable unit wherein the casing of the electrode holder will be rotatable relatively to said cable.

It is a still further object of this invention to produce an electrode holder and cable unit the electrode receiving portion of which is rotatable relatively to the cable.

It is a still further object of this invention to produce an electrode holder the electrode receiving portion of which is rotatable relatively to the remainder of the casing.

I achieve all of the foregoing as well as other objects by forming the electrode holder of a casing made of two parts one of which contains an electrode receiving chamber and is rotatable with respect to the other, by mounting an electrode clamping bar in said casing for longitudinal movement within said casing to and from an electrode clamping position and for rotative movement within said casing, by attaching coupling means to said electrode clamping bar for coupling said electrode clamping bar with the main cable, said clamping means being positioned for longitudinal and rotative movement within said casing, by mounting in said casing means longitudinally movable in said casing relatively to both said casing and cable for actuating said coupling means, and by providing means operable by the welder for longitudinally moving said coupling actuating means to a predetermined position.

For the purpose of illustrating my invention with the particularity required by law I have shown in the drawings which form a part hereof and will now describe two of the many possible structures into which my inventive concepts may be incorporated. In one of these forms, illustrated by Figures 1 to 11 inclusive, the head and body portions of the casing are not rotatable relatively to each other. In this modification I achieve all but the last of the objects hereinabove listed. In the other of these modifications, illustrated by Figures 1 to 5 and 7 to 12 inclusive the head of the casing is rotatable relatively to the body portion of the casing. In this modification I achieve all of the objects hereinabove listed.

In said drawings

Figure 1 is a front view of the novel handle. The clamping bar is in the electrode retaining position.

Figure 4 is a side view of the upper half of the handle looking in the direction of the arrow A—A in Figure 1.

Figure 5 is a section of the lower half of the handle taken along the line 5—5 on Figure 2.

Figure 6 is a section taken along the line 6—6 of Figure 2.

Figure 7 is a section along the line 7—7 of Figure 2.

Figure 8 is a section along the line 8—8 of Figure 2.

Figure 9 is a section along the line 9—9 of Figure 2.

Figure 10 is a section along the line 10—10 of Figure 2.

Figure 11 is the head fragment of the handle shown in Figure 2 associated with a modified cap.

Figure 12 is a section taken along the line 6—6 of Figure 2 but showing a modified form of locking ring. When this type of ring is used the head or electrode receiving portion is rotatable relatively to the remainder of said casing.

Figure 2:
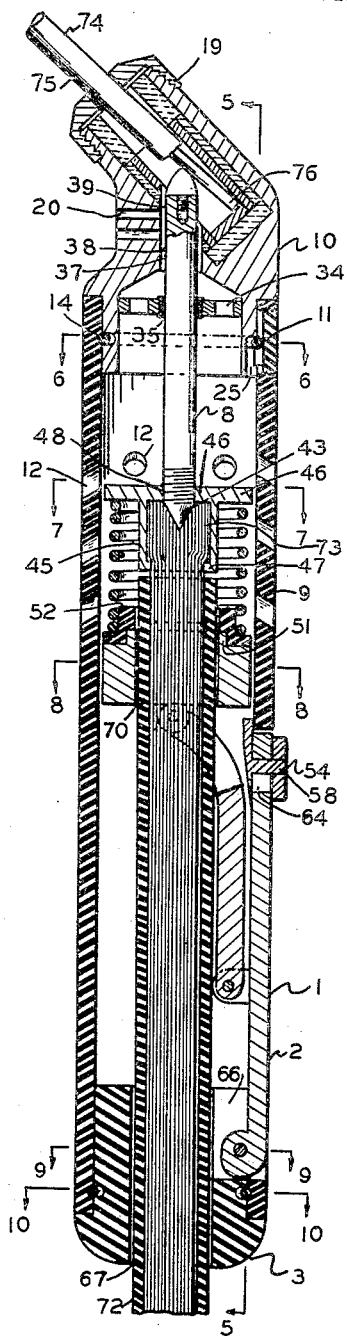
Figure 2 is a section taken along the line 2—2 of Figure 1.

Referring more particularly to the drawings wherein similar reference numerals denote similar parts reference numeral 1 designates the novel handle as a unit. The handle 1 consists of a casing 2, a base plug 3, a lever 4, a pressure bushing 5, a connector 6, a spring 7, and a clamping bar 8.

Figure 3:
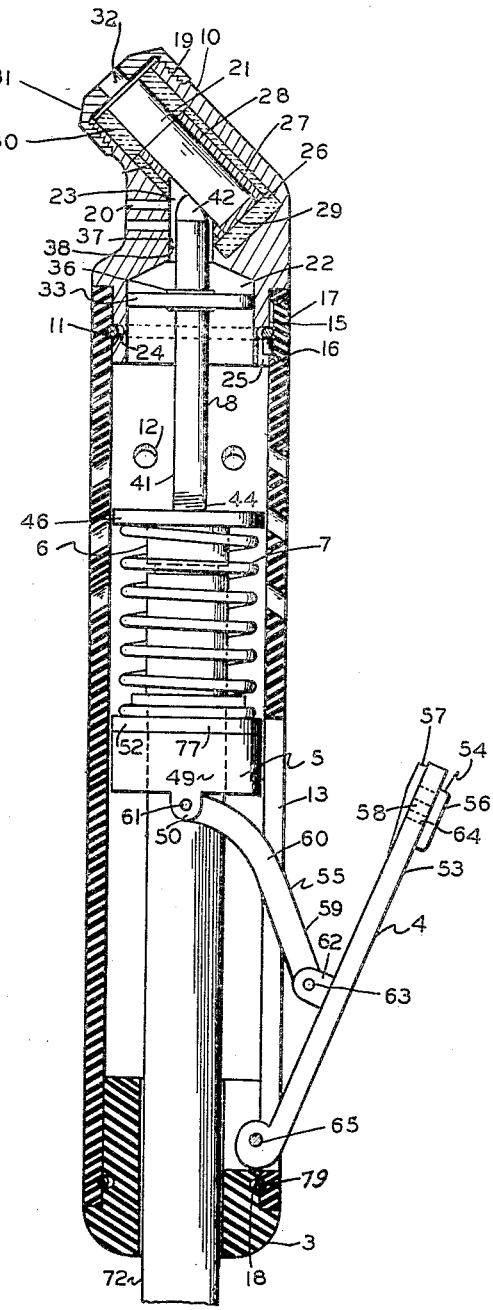
Figure 3 is a view taken similarly to Figure 2 but with the clamping bar in the open or electrode non-retaining position. Only the casing is shown in section.

The casing 2 consists of the tubular main body portion 9, and the hollow head 10 connected together by suitable means, such as the locking ring 11, in Figures 1, 2, 3, 4 and 6, or such as the locking ring 78 in Figure 12. When the locking ring 11 is used the hollow head 10 is not rotatable relatively to the tubular main body portion 9. When the locking ring 78 is used the hollow head 10 is rotatable relatively to the tubular main body portion 9.

The tubular main body portion 9 is made of suitable rigid insulating material, such as hard fibre, and has formed therein the ventilating apertures 12, a lever arm receiving slot 13, the head locking ring receiving groove 14, the unlocking finger receiving slot 15, the threaded head locking ring release aperture 16, and the base plug locking ring receiving groove 80. The ventilating apertures 12 also serve as outlets for the slag and other foreign matter which may find its way into the casing. The threaded head locking ring release aperture 16 is normally closed by a threaded plug 17 made of suitable rigid insulating material such as hard fibre.

The hollow head 10 is made of metal, has the external threads 19 formed thereon near its upper end, and has formed therein the ventilating apertures 20, the inclined electrode receiving chamber 21, the insulating disc chamber 22, the passage 23 which connects the chambers 21 and 22, the locking ring receiving groove 24, and the unlocking finger receiving slot 25.

Where one is planning to use the locking ring 78 instead of the locking ring 11, thereby making the hollow head rotatable relatively to the tubular main body portion 9, one may omit the unlocking finger receiving slots 15 and 25. Such a structure is shown in Figure 12.

The inclined electrode receiving chamber 21 has positioned on the floor therein the disc 26 made of suitable material which will not conduct either electricity or heat. An example of such a material is asbestos. The inclined electrode receiving chamber also has positioned therein a sleeve 27 of material, such as asbestos, which will not conduct either electricity or heat. A metal sleeve 28 is positioned within said asbestos sleeve 27. The lower surface of both the sleeves 27 and 28 contact with the upper face of the asbestos disc 26. Said upper face of said asbestos disc 26 also has positioned thereon the metallic disc 29 which extends into and is received within the metal sleeve 28. Both sleeves 27 and 28 terminate a short distance from the upper edge of the inclined electrode receiving chamber 21. A sleeve 30 made of rigid hard material, such as porcelain, which will not conduct electricity and which will not be affected by the heat created in its vicinity during the welding operation rests upon the upper surfaces of said sleeves 27 and 28 and extends upwardly therefrom within said inclined electrode receiving chamber 21 to the upper edge of said chamber 21. The inclined electrode receiving chamber 21 is roofed by the internally threaded cap 31 which is threadably attached to the hollow head 10 at its upper end. The cap 31 has formed therein an aperture 32 which registers with the inclined electrode receiving chamber 21. The end of the electrode 74 extends through said aperture 32 and into said chamber 21 as is shown in Figure 1. It is preferable that the aperture 32 should not be much larger than the diameter of the coated portion 75 of the electrode 74 although a certain amount of clearance is desirable. For this reason I provide a plurality of caps 31 to 31—N each having an aperture 32 of a different diameter than the other. The cap 31 in Figures 1, 2, 3, and 4 is illustrative of a cap having an aperture 32 of the smallest diameter of the series and the cap 31—N in Figure 11 is illustrative of a cap having an aperture 32—N of the largest diameter of the series. One need not necessarily use the caps 31 having apertures 32 of varying diameter. Instead one may use a cap having an aperture 32 of a diameter sufficient to receive the largest electrode which can be taken by the electrode holder. Further one may merely use a cap 31 having an aperture 32 of sufficient size to receive the largest electrode which the user expects to handle but which is not the largest electrode which the electrode holder is capable of handling. The cap 31 is illustrative of a cap having an aperture 32 of sufficient size to take the largest electrode which a user of the electrode holder intends to handle but which is not as large as the electrode which the electrode holder is capable of handling. The cap 31—N is illustrative of a cap having an aperture 32—N which will receive the largest electrode which the electrode holder here shown for the purpose of illustrating my invention is capable of holding. It is to be clearly understood however that the foregoing is for the purpose of illustration only and that there is no limit on the size of the electrode which can be handled by an electrode holder made in accordance with my invention.

The insulating disc chamber 22 has fixedly positioned therein the insulating disc 33. The insulating disc 33 is made of suitable rigid insulating material, such as hard fibre, and has formed therein the plurality of ventilating apertures 34 and the central aperture 35. The central aperture 35 is reinforced by a metallic eyelet 36 and has extending therethrough the clamping bar 8. The insulating disc 33 serves as a guide for the clamping bar 8 and also functions to insulate said clamping bar 8 from the metallic head 10. Said insulation of the clamping bar 8 from the metallic head is effected by making certain that an air space 37 is provided at all times between the cylindrical bounding wall 38 of the passage 23 and the outer surface 39 of the clamping bar 8. This result is achieved by making the internal diameter of the eyelet 36 smaller than the diameter of the passage 23 and by making the diameter of the clamping bar 8 smaller than the diameter of the reinforcing eyelet 36.

The head locking ring 11 consists of a split ring main body member which terminates at each of its ends in a downwardly extending finger 40.

The clamping bar 8 consists of a main body portion 41 and a tip 42 which is threadably attached to said main body portion at its upper end. The main body portion 41 is made of a material which conducts electricity and which has the necessary rigidity to enable the clamping bar 8 to clamp the uncoated end 76 of the electrode 74 without bending. I have found copper to be suitable for this purpose. The tip 42 is made detachable so that it may be readily replaced when it becomes worn. If desired it may be made of electrical conducting material which is harder than copper. The main body portion 41 of the clamping bar 8 terminates at its lower end in an inverted cone 43 and has formed thereon the threads 44 immediately above said cone.

The threads 44 of the clamping bar 8 cooperate with threads formed in the internally threaded aperture 48 in the head 46 of the connector 6 to connect the clamping bar 8 to the connector 6. The connector 6 consists of a tubular portion 45 terminating at its upper end in said head 46 and at its lower end in a flange 47. The tubular portion 45 receives the stripped end 73 of the cable 72. The cable wires so received are spread by the conical end 43 of the clamping bar 8 with the result that the cable 72 is firmly attached to the connector 6.

The pressure bushing 5 consists of a metallic main body portion 49 which has formed therein the bore 70 through which the cable 72 extends. The main body portion 49 has the ears 50 depending from the lower edge thereof and terminates at its upper end in a neck 51. The neck 51 has positioned thereon a collar 52 of suitable rigid insulating material. The insulating collar 52 serves as the seat of the lower end of the spring 7. I have found steel to be very suitable as a material for the main body member 49 and hard fibre a desirable material for the insulating collar 52.

Each of the ears 50 has connected thereto one of the prongs 60 of the fork 55 of the lever 4. The lever 4 consists of the pressure bar 53, the locking member 54, and the fork 55.

The locking member 54 consists of a button 56, a locking lug 57 and a pin 58 which connects the button 56 with the locking lug 57.

The fork 55 consists of a body portion 59 and the two prongs 60. The free end of each of the prongs 60 is pivotally attached to one of the ears 50 of the pressure bushing 5 by suitable means such as the pin 61. The free end of the body portion 59 is positioned between the arms 62 which extend from the pressure bar 53 and is pivotally attached to said arms by suitable means such as the pin 63.

The pressure bar 53 has formed therein near the upper end thereof a suitable slot 64 through which extends the pin 58 of the locking member 54 and in which said pin moves. The lower end of the pressure bar 53 is pivotally attached to the base plug 3 by the pin 65 which extends through said base plug 3 and the tubular main body portion 9.

The base plug 3 is made of rigid non-insulating material, such as hard fibre and has formed therein the locking ring receiving groove 18, the slot 66 which receives the lower end of the pressure bar 53, a suitable aperture through which said pressure bar pivot pin 65 extends, and the bore 67 through which the cable 72 extends. The base plug 3 is attached to the tubular main body portion 9 by means of a locking ring 79 which is received within the locking ring receiving grooves 18 and 80.

The pressure bushing 5, the connector 6, and the outermost periphery of the lower portion 77 of the insulating collar 52 are substantially diamond shaped in cross section. The diagonal D of each of said diamonds is slightly less than the internal diameter d of the tubular main body portion 9. Because of this structure the pressure bushing 5 and connector 6 may freely move in a vertical direction within said tubular body member. Further because of said structure air spaces 68 are formed between the walls 69 of the pressure bushing 5, the walls 70 of the connector 6 and the inner surface 71 of the tubular main body member 9. These air spaces 68 serve the double purpose of ventilating the electrode handle 1 and as exits for the slag and other foreign matter which may find its way into the electrode holder from the top.

Having described my invention what I claim as new and useful is:

1. In an electrode holder a casing consisting of a tubular main body portion made of rigid non-conducting material and having a locking ring receiving groove formed therein near the upper end thereof; a hollow metallic head having an electrode receiving chamber and a locking ring receiving groove formed therein mounted on said main body portion; and a locking ring positioned in said locking ring receiving grooves formed in said metallic head and said main body portion.

2. An electrode holder comprising a casing having an electrode receiving chamber formed therein; an electrode clamping bar mounted in said casing for longitudinal movement within said casing to and from an electrode clamping position and for rotative movement within said casing; coupling means mounted for longitudinal and rotative movement within said casing and attached to said electrode clamping bar for coupling said clamping bar with the main cable; means for actuating said coupling means mounted within said casing for longitudinal movement relatively to said casing and said cable; and means pivotally mounted in said casing and connected to said coupling actuating means for moving said coupling actuating means to a predetermined position.

3. An electrode holder comprising a casing having an electrode receiving chamber formed therein; an electrode clamping bar mounted in said casing for longitudinal movement within said casing to and from an electrode clamping position and for rotative movement within said casing; coupling means mounted for longitudinal and rotative movement within said casing and attached to said electrode clamping bar for coupling said electrode clamping bar with the main cable; means for actuating said coupling means mounted within said casing for longitudinal movement relatively to said casing and cable; resilient means positioned in said casing intermediate said coupling means and said coupling actuating means; and means pivotally mounted in said casing and connected to said coupling actuating means for moving said coupling actuating means to a predetermined position.

4. An electrode holder comprising a casing having formed therein an electrode receiving chamber and a cable chamber; an electrode clamping bar mounted for rotative movement in said cable chamber and for longitudinal movement in said cable chamber and into said electrode receiving chamber to an electrode clamping position; coupling means mounted for rotative and longitudinal movement in said cable chamber and attached to said clamping bar for coupling said clamping bar with the main cable; means for actuating said coupling means mounted within said cable chamber for longitudinal movement relatively to said casing and said cable; resilient means positioned in said cable chamber intermediate said coupling means and said coupling actuating means; and means pivotally mounted in said casing and connected to said coupling actuating means for moving said coupling actuating means to a predetermined position.

5. An electrode holder comprising a casing having formed therein an electrode receiving chamber, a cable chamber, and a connecting chamber intermediate said cable and electrode receiving chambers; an electrode clamping bar mounted for rotative movement and for longitudinal movement in said cable chamber and projecting into said communicating chamber; coupling means mounted for rotative and longitudinal movement in said cable chamber and attached to said clamping bar for coupling said clamping bar with the main cable; means for longitudinally actuating said coupling means mounted within said cable chamber for longitudinal movement relatively to said casing and said cable; resilient means positioned in said cable chamber intermediate said coupling means and said coupling actuating means; and means pivotally mounted in said casing and connected to said coupling actuating means for longitudinally moving said coupling actuating means to a predetermined position.

6. An electrode holder and cable unit comprising a tubular main body portion made of rigid non-conducting material and having a locking ring receiving groove formed therein near the upper end thereof; a hollow metallic head having an electrode receiving chamber and a locking ring receiving groove formed therein mounted on said main body portion; a locking ring positioned in said locking ring receiving grooves formed in said metallic head and said main body portion; an electrode clamping bar mounted in said casing for longitudinal movement within said casing to and from an electrode clamping position and for rotative movement within said casing; a main cable extending freely into said casing; coupling means mounted for longitudinal and rotative movement within said casing and attached to said electrode clamping bar for coupling said electrode clamping bar with said main cable; means for actuating said coupling means mounted within said casing for longitudinal movement relatively to said casing and cable; resilient means positioned in said casing intermediate said coupling means and said coupling actuating means; and means pivotally mounted in said casing and connected to said coupling actuating means for moving said coupling actuating means to a predetermined position.

7. An electrode holder and cable unit comprising a casing having an electrode receiving chamber formed therein; an electrode clamping bar mounted in said casing for longitudinal movement within said casing to and from an electrode clamping position and for rotative movement within said casing; a main cable extending freely into said casing; coupling means mounted for longitudinal and rotative movement within said casing and attached to said electrode clamping bar and cable for coupling said clamping bar with said main cable; means for actuating said coupling means mounted within said casing for longitudinal movement relatively to said casing and said cable; and means pivotally mounted in said casing and connected to said coupling actuating means for moving said coupling actuating means to a predetermined position.

8. An electrode holder and cable unit comprising a casing having an electrode receiving chamber formed therein; an electrode clamping bar mounted in said casing for longitudinal movement within said casing to and from an electrode clamping position and for rotative movement within said casing; a main cable extending freely into said casing; coupling means mounted for longitudinal and rotative movement within said casing and attached to said electrode clamping bar and cable for coupling said electrode clamping bar with said main cable; means for actuating said coupling means mounted within said casing for longitudinal movement relatively to said casing and cable; resilient means positioned in said casing intermediate said coupling means and said coupling actuating means; and means pivotally mounted in said casing and connected to said coupling actuating means for moving said coupling actuating means to a predetermined position.

9. An electrode holder and cable unit comprising a casing having formed therein an electrode receiving chamber and a cable chamber, an electrode clamping bar mounted for rotative movement in said cable chamber and for longitudinal movement in said cable chamber and into said electrode receiving chamber to an electrode clamping position; a main cable extending freely into said casing; coupling means mounted for rotative and longitudinal movement in said cable chamber and attached to said main cable and to said clamping bar for coupling said clamping bar with said main cable; means for actuating said coupling means mounted within said cable chamber for longitudinal movement relatively to said casing and said cable; resilient means positioned in said cable chamber intermediate said coupling means and said coupling actuating means; and means pivotally mounted in said casing and connected to said coupling actuating means for moving said coupling actuating means to a predetermined position.

10. An electrode holder and cable unit comprising a casing having formed therein an electrode receiving chamber, a cable chamber, and a chamber connecting said electrode receiving and cable chambers; a spacing and insulating member having an aperture formed therein positioned in one of said chambers with the periphery of said aperture falling within the periphery of the bounding walls of said communicating chamber; an electrode clamping bar extending from said cable chamber through said aperture in said spacing and insulating member, said electrode clamping bar being mounted for rotative movement in said chambers and for longitudinal movement in said cable and communicating chambers into said electrode receiving chamber to an electrode clamping position; a main cable extending freely into said casing; coupling means mounted for rotative and longitudinal movement in said cable chamber and attached to said cable and to said clamping bar for coupling said clamping bar with said main cable; means for actuating said coupling means mounted in said cable chamber for longitudinal movement relatively to said casing and said cable; resilient means positioned in said cable chamber intermediate said coupling means and said coupling actuating means; and means carried by said casing and connected to said coupling actuating means for moving said coupling actuating means to a predetermined position.

11. An electrode holder and cable unit comprising a casing having formed therein an electrode receiving chamber, a cable chamber, and a chamber connecting said electrode receiving and cable chambers; a spacing and insulating member having an aperture formed therein positioned in said cable chamber with the periphery of said aperture falling within the periphery of the bounding walls of said communicating chamber; an electrode clamping bar extending from said cable chamber through said aperture in said spacing and insulating member into said connecting chamber, said electrode clamping bar being mounted for rotative movement in said chambers and for longitudinal movement in said cable and communicating chambers into said electrode receiving chamber to an electrode clamping position; a main cable extending freely into said casing; coupling means mounted for rotative and longitudinal movement in said cable chamber and attached to said cable and to said clamping bar for coupling said clamping bar with said main cable; means for actuating said coupling means mounted in said cable chamber for longitudinal movement relatively to said casing and said cable; resilient means positioned in said cable chamber intermediate said coupling means and said coupling actuating means; and means carried by said casing and connected to said coupling actuating means for moving said coupling actuating means to a predetermined position.

12. An electrode holder and cable unit comprising a casing having formed therein an electrode receiving chamber, a spacing and insulating member having an aperture formed therein positioned in said casing with the periphery of said aperture falling within the periphery of the bounding walls of both said electrode receiving chamber and said casing; an electrode clamping bar positioned in said casing, extending through said aperture in said spacing and insulating member and mounted for longitudinal movement within said casing to and from an electrode clamping position and for rotative movement within said casing; a main cable extending freely into said casing; coupling means mounted for longitudinal and rotative movement within said casing and attached to said electrode clamping bar and to said main cable; means for actuating said coupling means mounted in said casing for longitudinal movement relatively to said casing and said cable; and means carried by said casing and connected to said coupling actuating means for moving said coupling actuating means to a predetermined position.

13. An electrode holder comprising a casing having formed therein an electrode receiving chamber, a cable chamber, and a connecting chamber intermediate said cable and electrode receiving chambers; a spacing and insulating member having an aperature formed therein positioned in one of said chambers with the periphery of said aperture falling within the periphery of the bounding walls of said communicating chamber; an electrode clamping bar extending from said cable chamber through said aperture in said spacing and insulating member and mounted for rotative movement in said chambers and for longitudinal movement in said cable and communicating chambers for projection into said electrode receiving chamber to an electrode clamping position; coupling means mounted for rotative and longitudinal movement in said cable chamber and attached to said clamping bar for coupling said clamping bar with the main cable; means for longitudinally actuating said coupling means mounted in said cable chamber for longitudinal movement relatively to said casing and said cable; resilient means positioned in said cable chamber intermediate said coupling means and said coupling actuating means; and means carried by said casing and connected to said coupling actuating means for longitudinally moving said coupling actuating means to a predetermined position.

14. An electrode holder comprising a casing having formed therein an electrode receiving chamber, a cable chamber, and a connecting chamber intermediate said cable and electrode receiving chambers; a spacing and insulating member having an aperture formed therein positioned in said cable chamber with the periphery of said aperture falling within the periphery of the bounding walls of said communicating chamber; an electrode clamping bar extending from said cable chamber through said aperture in said spacing and insulating member into said communicating chamber and mounted for rotative movement in said chambers and for longitudinal movement in said cable and communicating chambers into said electrode receiving chamber to an electrode clamping position; coupling means mounted for rotative and longitudinal movement in said cable chamber and attached to said clamping bar for coupling said clamping bar with the main cable; means for longitudinally actuating said coupling means mounted in said cable chamber for longitudinal movement relatively to said casing and said cable; resilient means positioned in said cable chamber intermediate said coupling means and said coupling actuating means; and means carried by said casing and connected to said coupling actuating means for longitudinally moving said coupling actuating means to a predetermined position.

15. An electrode holder and cable unit comprising a casing having formed therein an electrode receiving chamber; a spacing and an insulating member having an aperture formed therein positioned in said casing with the periphery of said aperture falling within the periphery of the bounding walls of both said electrode receiving chamber and said casing; an electrode clamping bar positioned in said casing, extending through said aperture in said spacing and insulating member, and mounted for longitudinal movement in said casing to and from an electrode clamping position and for rotative movement within said casing; coupling means mounted for rotative and longitudinal movement in said casing and attached to said clamping bar for coupling said clamping bar with the main cable; means for actuating said coupling means mounted in said casing for longitudinal movement relatively to said casing and said cable; and means carried by said casing and connected to said coupling actuating means for moving said coupling actuating means to a predetermined position.

PAUL ERIKSEN.